(12) United States Patent
Revuru et al.

(10) Patent No.: US 11,611,513 B2
(45) Date of Patent: Mar. 21, 2023

(54) SYSTEM AND METHOD FOR DISCOVERING INTERFACES IN A NETWORK

(71) Applicant: LARSEN AND TOUBRO INFOTECH LIMITED, Maharashtra (IN)

(72) Inventors: Ramesh Revuru, Karnataka (IN); Gaurav Shrivastava, Maharashtra (IN)

(73) Assignee: LARSEN AND TOUBRO INFOTECH LIMITED, Maharashtra (IN)

( * ) Notice: Subject to any disclaimer, the term of this patent is extended or adjusted under 35 U.S.C. 154(b) by 0 days.

(21) Appl. No.: 17/205,021

(22) Filed: Mar. 18, 2021

(65) Prior Publication Data
US 2022/0019492 A1    Jan. 20, 2022

(30) Foreign Application Priority Data

Jul. 17, 2020   (IN) .............................. 202021030612

(51) Int. Cl.
*H04L 47/28*     (2022.01)
*G06F 9/54*      (2006.01)
(Continued)

(52) U.S. Cl.
CPC .............. *H04L 47/28* (2013.01); *G06F 9/541* (2013.01); *G06F 9/546* (2013.01); *G06Q 30/00* (2013.01);
(Continued)

(58) Field of Classification Search
CPC . H04L 49/90; H04L 49/3063; H04L 49/3018; H04L 49/3027; H04L 47/2441; H04L 47/2433; H04L 47/28; H04L 12/6418; H04L 45/74; H04L 47/2483; G06Q 30/00; G06Q 10/087; G06Q 10/0833
See application file for complete search history.

(56) References Cited

U.S. PATENT DOCUMENTS 7,127,507 B1   10/2006  Clark et al.
7,379,998 B2    5/2008  Love et al.
(Continued)

FOREIGN PATENT DOCUMENTS

IN          227557         7/2005

*Primary Examiner* — Kyung H Shin
(74) *Attorney, Agent, or Firm* — Tim Tingkang Xia, Esq.; Locke Lord LLP

(57) ABSTRACT

A system and method for discovering interfaces in a network is provided wherein a remote system is configured to discover by connecting to plurality of servers, and intelligently stitching together interfaces that exist between different applications. The remote system is configured to identify these interfaces through message queue servers in the network and their queue managers. Further, stitching together the interfaces is done based upon the hops that a message performs from one system to its target application using message queues. Interface name is created by reading message header, applications involved and queue properties. The system capabilities also include tracking the usage of interfaces based on the traffic that is flowing through them. The system provides a repeatable process to obtain accurate repository of interfaces.

16 Claims, 2 Drawing Sheets

(51) Int. Cl.
*H04L 69/22* (2022.01)
*H04L 67/562* (2022.01)
*G06Q 30/00* (2023.01)
*H04L 12/64* (2006.01)
*H04L 47/2441* (2022.01)

(52) U.S. Cl.
CPC ........ *H04L 12/6418* (2013.01); *H04L 67/562* (2022.05); *H04L 69/22* (2013.01); *H04L 47/2441* (2013.01)

(56) References Cited

U.S. PATENT DOCUMENTS

| | | | |
|---|---|---|---|
| 7,716,678 B2 | 5/2010 | Herrmann | |
| 8,307,074 B1 * | 11/2012 | Martin | H04L 12/6418 709/224 |
| 2014/0367463 A1 * | 12/2014 | Cibor | G06Q 30/00 235/375 |
| 2020/0044976 A1 * | 2/2020 | Chang | H04L 47/28 |

\* cited by examiner

SYSTEM AND METHOD FOR DISCOVERING INTERFACES IN A NETWORK

FIELD OF THE INVENTION

The invention relates to a system and method to discover interfaces in a network and build a repository of interfaces.

BACKGROUND OF THE INVENTION

A network typically has several client terminals and/or servers with a variety of applications for dedicated operations, activities or tasks requiring different applications to communicate with each other within the network. These communications lead to multiple integrations and communication channels across the applications which lead to multiple interfaces.

A significant problem that has been identified is that organizations usually are not aware of all interfaces within applications in a network. Accordingly, many organizations adopt a manual process for identifying and documenting the communication and integration interfaces. However, given that the organization uses multiple applications leading to multiple interfaces, the manual process ends up being a time consuming, tedious, and error-prone process.

Further, it is also possible that existing interfaces are modified, or a new set of integrations are added by the time the manual process of identifying and documenting the interfaces is completed. The modified or the new set of integrations thus becomes impossible to be discovered in the manual process of identifying and documenting the interfaces. Also, interfaces over time become redundant and obsolete thereby consuming infrastructure with no benefit. However, since a repository of interfaces is not readily available, tracking such redundant and obsolete interfaces is not possible.

Thus, there is a need in the art for a method and a system to build a repository of the interfaces which solves at least the aforementioned problems.

SUMMARY OF THE INVENTION

In one aspect the present invention provides a system for discovering interfaces in a network. The system comprises a remote system configured to communicate with plurality of servers, message queue servers, message broker, enterprise service bus (ESB) applications/platforms of the network, the remote system comprising at-least one processor configured to identify one or more message queue servers in the network; identify one or more queue managers of the message queue servers to create a list of queue managers; communicate with each queue manager to identify one or more message queues managed/operated by the queue managers to create a list of message queues; communicate with message queues to identify message brokers/ESB applications and client applications communicating with the message queues; create a list of message brokers or ESB applications/platforms and a list of client applications/programs; analyze message brokers or ESB applications/platforms and the list of client applications/programs to extract metadata by reading header information of messages passing through the message queue; and retrieve interface names to create a repository.

In another aspect the present invention provides a method for discovering interfaces in a network. The method comprises the steps of: identifying by a remote server one or more message queue servers in the network; identifying one or more queue managers of the message queue servers to create a list of queue managers; communicating with each queue manager to identify one or more message queues managed/operated by the queue managers to create a list of message queues; communicating with message queues to identify message brokers/ESB applications and client applications communicating with the message queues; creating a list of message brokers or ESB applications/platforms and a list of client applications/programs; analyzing message brokers or ESB applications/platforms and the list of client applications/programs to extract metadata by reading header information of messages passing through the message queue; and retrieve interface names to create a repository.

BRIEF DESCRIPTION OF THE DRAWINGS

Reference will be made to embodiments of the invention, examples of which may be illustrated in accompanying figures. These figures are intended to be illustrative, not limiting. Although the invention is generally described in context of these embodiments, it should be understood that it is not intended to limit the scope of the invention to these particular embodiments.

DETAILED DESCRIPTION OF THE INVENTION

The present invention is directed towards discovering interfaces in a network having plurality of clients and/or servers. The present invention is designed to automatically build a repository of interfaces installed/deployed on servers.

Figure 1:
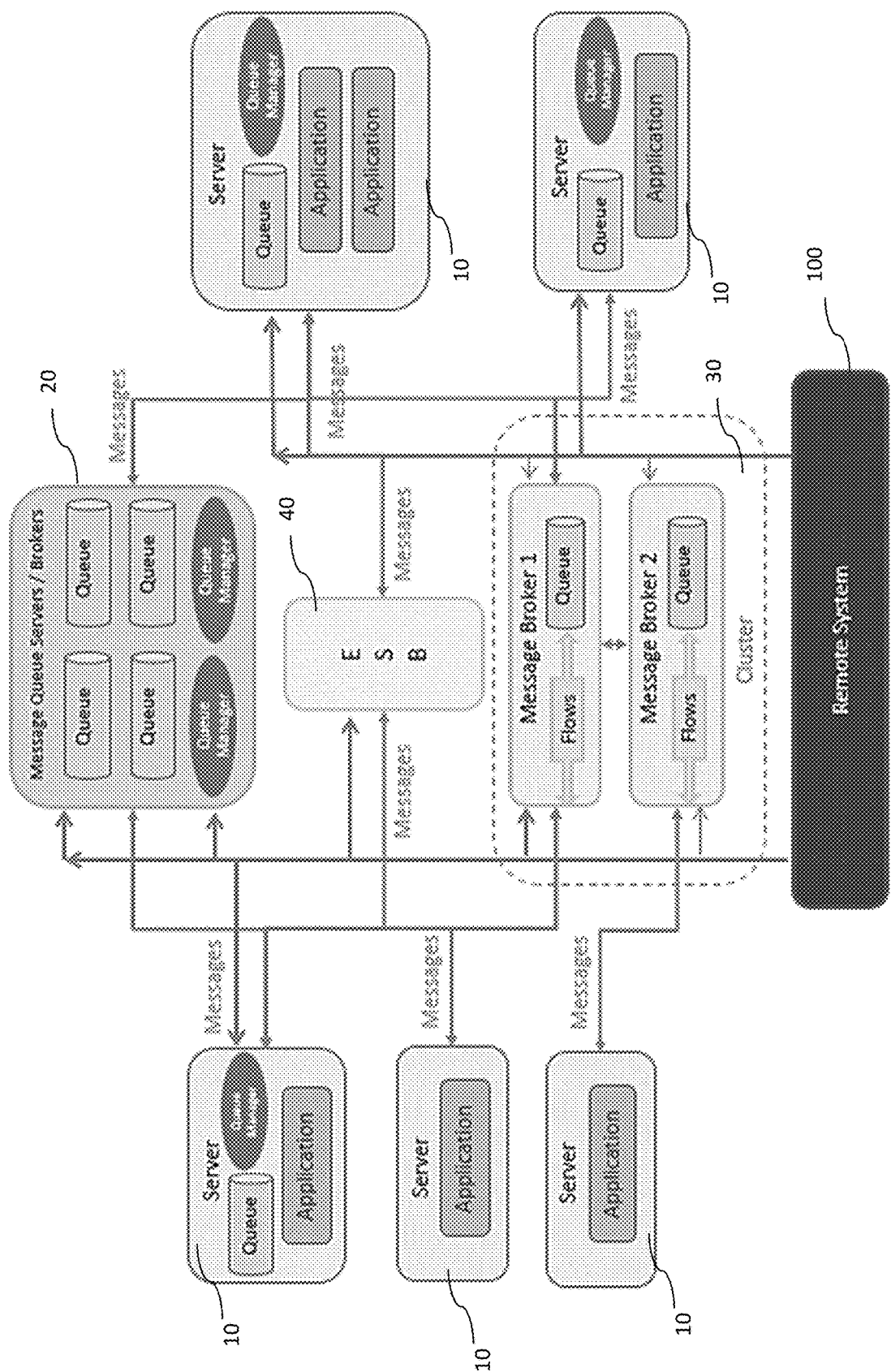
FIG. 1 shows a system for discovering interfaces in a network in accordance with an embodiment of the invention.

FIG. 1 shows a system 100 for discovering interfaces in a network. The system is a remote system comprising of at least one or more processors, a memory, a storage unit, a communication module, a display, etc configured to communicate with plurality of servers 10, message queue servers 20, message broker 30, enterprise service bus (ESB) applications/platforms 40 of the network. Each server has one or more applications communicating with applications of other client terminals and/or servers on the network. In this regard, the servers communicate through the message queue servers and message broker/ESB applications/platforms of the network.

In an embodiment, the processor of the remote system is configured to identify the message queue servers. The system receives an input list of servers on which middleware components are installed. From the list of servers, the remote system is configured to identify the queue managers installed in the network. Alternately, one or more message queue servers in the network are identified by extracting information from a product application management monitoring tool of the network. Furthermore, one or more message queue servers in the network can also be identified by scanning the network. From the message queue servers, queue managers of the message queue servers are identified, and a list of queue managers is created. Attributes of the queue mangers such as queue manager name, queue manager version, IP address and port details are extracted and stored on the remote system for further processing. The queue manager name, version, IP address and port details enables identification of a queue manager uniquely in a network. For example: A queue manager with Name "CustomerQM" exists at IP (192.20.15.84) and at port 8151. The aforesaid information gives information of all the queue managers available in the network.

The remote system communicates with the queue managers to identify one or more message queues on the queue managers to create a list of message queues. The remote system communicates with the queue managers through product management APIs. Details of the message queues such as IP address, port, queue manager name, queue manager version, queue name, etc are extracted and stored on the remote system for further processing. The IP address, port, queue manager name, queue manager version enable identification of all the queues that are being managed by the queue manager. For example Queue manager "CustomerQM" is managing queues with names Q1, Q2 and Q3.

The remote system communicates with the message queues to identify message brokers/ESB applications and client applications that may be communicating with the message queues. The remote system communicates with the message queues through product management APIs. Based on the aforesaid, a list of message brokers or ESB applications/platforms and a list of client applications/programs is generated by the remote system. Accordingly, the remote system has the list of message brokers or ESB applications/platforms and the list of client applications/programs. The remote system analyses the lists to extract metadata by reading header information of messages passing through the message queue to retrieve interface names. Typical structure of a message queue is shown below:

| Column Name | Column Type | Description |
| --- | --- | --- |
| MsgID | Text | Unique ID of the message |
| MsgType | Text | Type of message: Request/Reply |
| ApplOrigin | Text | Application that published the message |
| CorID | Text | Correlation ID |
| MsgTime | Time | Message Time |
| MsgDate | Date | Message Date |
| User | Text | Name of the user |

In an embodiment, interface names can be extracted from header information of the message such as application origin, message type and information. In this regard, metadata of queues/message such as source and target application names, interface ID or other description or message/object name is extracted. In an embodiment, the interface names retrieved are stored on the database of the remote system. The present invention thus tracks and maintains a repository of interfaces in the network. The remote system can be configured to discover the interfaces at regular intervals to obtain an accurate repository of interfaces. Accordingly, the remote system provides a repetitive process to create a repository of interfaces which is an updated and an accurate repository of interfaces.

Figure 2:
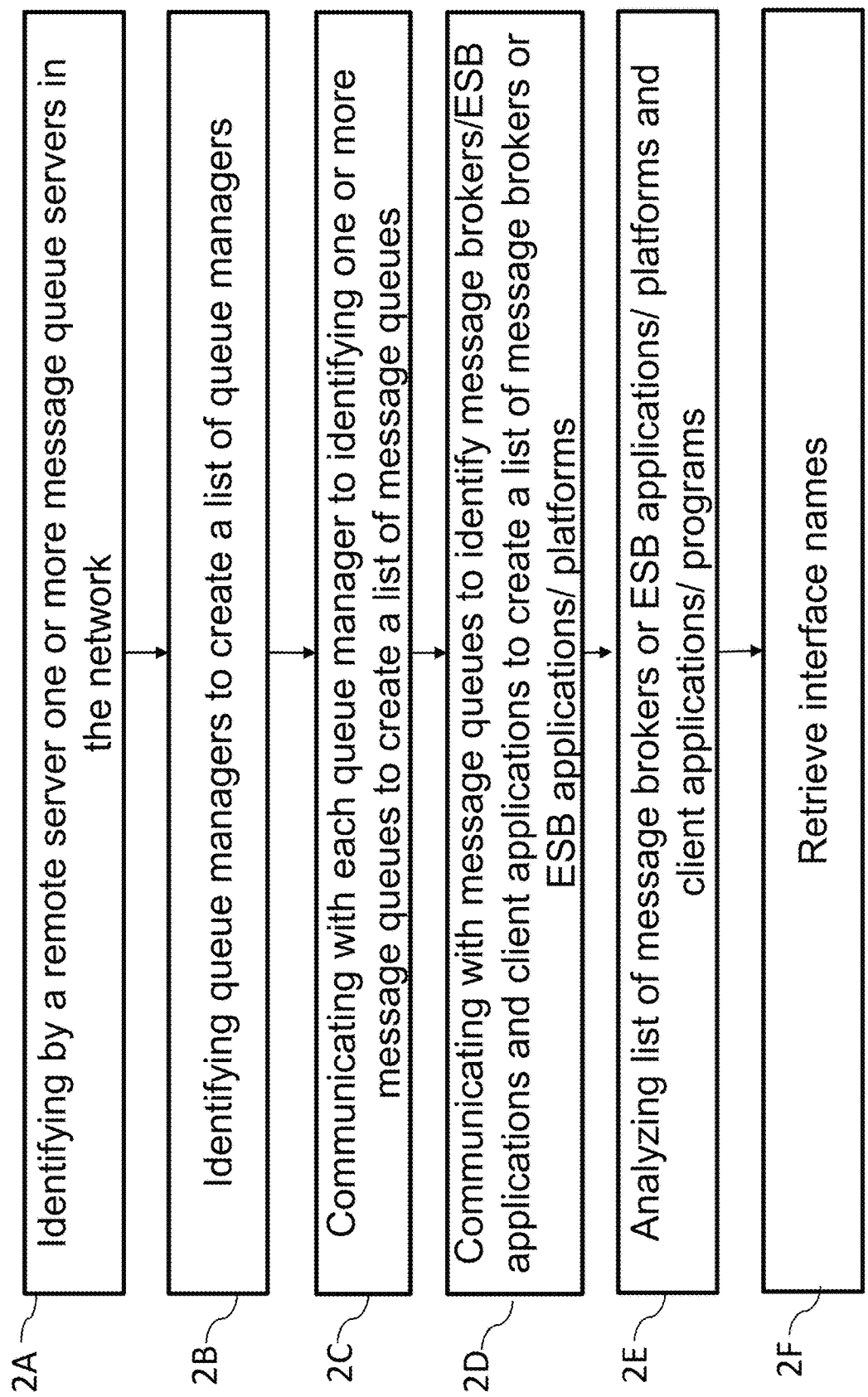
FIG. 2 illustrates a flow diagram of a method for discovering interfaces in a network in accordance with an embodiment of the invention.

FIG. 2 shows a method for discovering interfaces in a network. In order to perform such a method, a system such as the system shown in FIG. 1 may be deployed. The method starts at step 2A where the remote system identifies the message queue servers in the network. In this regard, an input list of servers on which middleware components are installed is received. From the list of servers, the remote system is configured to identify the queue managers installed in the network. Alternately, one or more message queue servers in the network are identified by extracting information from a product application management monitoring tool of the network. Furthermore, one or more message queue servers in the network can also be identified by scanning the network. At step 2B, queue managers of the message queue server are identified, and a list of queue managers is created. Thereafter at step 2C, the remote server communicates with each queue manager to identify one or more message queues on the queue managers to create a list of message queues. At step 2D, the remote server communicates with the message queues to identify message brokers/ESB applications and client applications that may be communicating with the message queues, and a list of message brokers or ESB applications/platforms and a list of client applications/programs is generated. The list of message brokers or ESB applications/platforms and the list of client applications/programs are analyzed at step 2E to extract metadata by reading header information of messages passing through the message queue and retrieve interface names 2F. In an embodiment, the interface names retrieved are stored on the remote system. The present invention thus tracks and maintains a repository of interfaces in the network. The remote server can be configured to discover the interfaces at regular intervals to obtain an accurate repository of interfaces. Accordingly, the remote system provides a repetitive process to create a repository of interfaces which is an updated and an accurate repository of interfaces.

Further, the remote system is configured to capture message related data of messages hoping through the network. In this regard, the remote system clones the messages with all header values wherein sensitive data from the messages is excluded. The remote system intercepts every message that is published across all the queues available in the network and captures details such as message Identifier, time published, Correlation Identifier, Reply To, Destination Value, Mode of Delivery, Redelivered value, Message Type, Message Expiration, Message Priority, Message Properties, etc. Thereafter, the remote system monitors the messages transferring or hopping from one queue to another to determine and build or stitch a linkage between one or more interfaces across multiple applications. The messages can be tracked based on unique identifier of the message.

Furthermore, the remote system is configured to track traffic i.e. messages flowing through the discovered interfaces. For each message, the remote system determines message header values, message body fields, time and location of message. The remote system further determines number and frequency of messages flowing through interfaces to determine whether the interface is active or non-active. Thus, with the present invention tracking redundant and obsolete interfaces is possible.

Advantageously, the present invention enables discovery of interfaces by a remote system, whereby the interfaces discovered are stored and made available in real-time. The present invention thus obviates the disadvantages associated with the manual process of discovering interfaces.

The foregoing description of the invention has been set merely to illustrate the invention and is not intended to be limiting. Since the modifications of the disclosed embodiments incorporating the spirit and substance of the invention may occur to the person skilled in the art, the invention should be construed to include everything within the scope of the disclosure.

The invention claimed is:

1. A system for discovering interfaces in a network, the system comprising:
    a remote system configured to communicate with a plurality of servers, message queue servers, message broker, enterprise service bus (ESB) applications/platforms of the network, the remote system comprising at-least one processor configured to (1) identify one or more message queue servers in the network;
(2) identify one or more queue managers of the message queue servers to create a list of queue managers;
(3) communicate with each queue manager to identify one or more message queues managed/operated by the queue managers to create a list of message queues;
(4) communicate with the message queues through product management application programming interfaces (APIs) to identify message brokers/ESB applications and client applications communicating with the message queues;
(5) create a list of message brokers or ESB applications/platforms and a list of client applications/programs;
(6) analyze the list of message brokers or ESB applications/platforms and the list of client applications/programs to extract metadata by reading header information of messages passing through the message queues; and
(7) retrieve interface names from at-least the header information of the messages; and
(8) store the interface names in the remote system to create a repository of interfaces.

2. The system as claimed in claim 1, wherein the one or more message queue servers in the network are identified by scanning the network.

3. The system as claimed in claim 1, wherein the one or more message queue servers in the network are identified by extracting information from a product application management monitoring tool of the network.

4. The system as claimed in claim 1, wherein the retrieved interface names are stored on the remote system.

5. The system as claimed in claim 1 further configured to monitor the messages transferring or hopping from one queue to another to determine and build or stitch a linkage between one or more interfaces across multiple applications.

6. The system as claimed in claim 1 further configured to track the messages flowing through the discovered interfaces.

7. The system as claimed in claim 6, wherein for each message, the remote system determines message header values, message body fields, time and location of the messages.

8. The system as claimed in claim 6, configured to determine number and frequency of the messages flowing through the interfaces to determine whether the interfaces are active or non-active.

9. The method as claimed in claim 1, wherein the remote system repeats step (1) to step (8) at regular intervals to update the repository of interfaces.

10. A method for discovering interfaces in a network, the method comprising the steps of:
(1) identifying by a remote server one or more message queue servers in the network;
(2) identifying one or more queue managers of the message queue servers to create a list of queue managers;
(3) communicating with each queue manager to identify one or more message queues managed/operated by the queue managers to create a list of message queues;
(4) communicating with the message queues through product management application programming interfaces (APIs) to identify message brokers/ESB applications and client applications communicating with the message queues;
(5) creating a list of message brokers or ESB applications/platforms and a list of client applications/programs;
(6) analyzing the list of message brokers or ESB applications/platforms and the list of client applications/programs to extract metadata by reading header information of messages passing through the message queues; and
(7) retrieve interface names from at-least the header information of the messages;
(8) store the interface names in the remote system to create a repository of interfaces.

11. The method as claimed in claim 10 comprising the step of identifying the one or more message queue servers in the network is done by scanning.

12. The method as claimed in claim 10 comprising the step of identifying the one or more message queue servers in the network is done by extracting information from a product application management monitoring tool of the network.

13. The method as claimed in claim 10 comprising the step of monitoring the messages transferring or hopping from one queue to another to determine and build or stitch a linkage between one or more interfaces across multiple applications.

14. The method as claimed in claim 10 comprising the step of tracking the messages flowing through the discovered interfaces.

15. The method as claimed in claim 10 comprising the step of determining number and frequency of the messages flowing through the interfaces to determine whether the interfaces are active or non-active.

16. The method as claimed in claim 10, wherein the remote system repeats step (1) to step (8) at regular intervals to update the repository of interfaces.

* * * * *